(12) United States Patent
Naastad

(10) Patent No.: US 6,616,022 B1
(45) Date of Patent: Sep. 9, 2003

(54) BICYCLE SUPPORT SYSTEM

(76) Inventor: David Naastad, 1693 S. Quintero Way, Aurora, CO (US) 80017

( * ) Notice: Subject to any disclaimer, the term of this patent is extended or adjusted under 35 U.S.C. 154(b) by 0 days.

(21) Appl. No.: 09/922,257

(22) Filed: Aug. 3, 2001

(51) Int. Cl.[7] .................................................. B60R 9/00
(52) U.S. Cl. ...................... 224/533; 224/519; 224/522; 224/523; 224/530; 224/531
(58) Field of Search ................................. 224/533, 403, 224/518, 519, 520, 522, 523, 530, 531, 924; 211/22

(56) References Cited

U.S. PATENT DOCUMENTS

| | | | |
|---|---|---|---|
| 4,057,182 A | 11/1977 | Kolkhorst et al. | |
| 4,171,077 A | 10/1979 | Richard, Jr. | |
| 4,219,142 A | * 8/1980 | Macpherson | 211/22 |
| 5,372,287 A | 12/1994 | Deguevara | |
| 5,573,165 A | 11/1996 | Bloemer et al. | |
| 5,593,076 A | 1/1997 | Biondo | |
| 5,685,469 A | 11/1997 | Stapleton | |
| 5,775,555 A | 7/1998 | Bloemer et al. | |

* cited by examiner

*Primary Examiner*—Stephen K. Cronin
*Assistant Examiner*—Maerena W. Brevard
(74) *Attorney, Agent, or Firm*—Ramon L. Pizarro; Edwin H. Crabtree

(57) ABSTRACT

A system for supporting and carrying bicycles. The system cooperating with the interior surfaces of the seat post engagement tube and includes an adjustable post having a first end and a second end, the first end having an attachment mechanism adapted for connecting the post to a support surface. The second end having at least two generally parallel surface areas at an adjustable distance from one another, so that the distance between the generally parallel areas can be enlarged or reduced in a generally radial manner to create or maintain line contact with the interior surface of the seat post engagement tube.

7 Claims, 4 Drawing Sheets

BICYCLE SUPPORT SYSTEM

BACKGROUND OF THE INVENTION (a) Field of the Invention

This invention generally relates to a support system for holding bicycles while being transported. More particularly, but not by way of limitation, to a bicycle support system that uses the seat post support on a bicycle frame to support a bicycle from a support, such as a transport rack on a vehicle.

(b) Discussion of Known Art

There has been a long felt need for racks that support bicycles while not in use. One common approach in the bicycle rack designs is to provide some sort of structure that cooperates with the wheels of the bicycle to hold the bicycle in an upright position. Other devices use the crossbar member of a bicycle frame to support the bicycle in an upright position while being transported.

Known examples of racks that use the bicycle frame support a bicycle in an upright position can be found in U.S. Pat. No. 5,775,555 to Bloemer et al. These types of devices work well with bicycle frames that include a crossbar, meaning the structural member that extends from the seatpost area of the bicycle frame to the head tube, and is generally parallel to the ground. This crossbar is also referred to as the top tube by many bicycle designers or manufacturers. However, many new bicycle frame designs do not include crossbar. For example, U.S. Pat. No. 6,164,676 to Wilcox, issued Dec. 26, 2000, incorporated herein by reference, shows and discusses these types of frames, which do not include a crossbar as found in well known designs that include a crossbar. The absence of this crossbar makes this type of bicycle awkward, if not impossible, to carry on bike racks such as the rack described by Bloemer.

Still further, many bicycle racks that engage the bicycle's wheels or the wheel axle support on the front fork, and support the bicycle in an upright position, require the use of several clamps for securing the front fork and then the rear wheel to the rack. Furthermore, these racks can only be used over large flat areas over a vehicle, such as the roof of a vehicle or the bed of a pickup truck.

Thus, a review of known solutions and approaches at bicycle racks and carriers reveals that there remains a need for a bicycle rack or carrier that can support all styles of bicycles, without the need of special adjustments or modifications.

Still further, there remains a need for a bicycle rack or support system that is versatile, and that can accommodate several bicycles of different frame designs.

There remains a need for a bicycle support system that can be easily adapted for carrying bicycles on the back of a vehicle, the roof of a vehicle, or the bed of a truck. The adaptability allowing the user to place the support system on a location of the vehicle that will allow the most efficient use of the vehicle's cargo carrying ability. For example, if a pickup truck is to be used to carry a large number of smaller items that must be carried in the bed of the truck, preventing the user from being able to carry bicycles in the bed, then it would be advantageous to have a system that can be easily converted to allow the user to carry the bicycle or bicycles from the rear of the truck.

Similarly, there remains a need for a system that allows a user to convert the male attachment used on a receiver hitch to a bicycle support or rack with minimal effort.

SUMMARY

It has been discovered that the problems left unanswered by known art can be solved by providing a system for supporting bicycles having a seat post engagement tube. The system allowing support of the bicycle from a support structure. The system cooperating with the interior surfaces of the seat post engagement tube and including:

An adjustable post having a first end and a second end, the first end having an attachment mechanism adapted for connecting the post to a support surface. The second end having at least two generally parallel surface areas at an adjustable distance from one another, so that the distance between the generally parallel areas can be enlarged or reduced in a generally radial manner to create or maintain line contact with the interior surface of the seat post engagement tube.

It is important to note that what is meant by "line contact" as used herein, means contact on at least two points on one of the surface areas. The contact on the opposite surface area may be point contact or line contact. The expansion of the adjustable post allows the system to accommodate a variety of different bicycles and allows the system to generate a powerful clamping action or cooperation with the seat post tube of the bicycle supported with the system.

It is contemplated that the system may be sold to the consumer as part of a kit, with a frame that mounts on the vehicle, providing the consumer with the option of buying as many adjustable posts as are needed to transport the number of bicycles owned by the consumer. In one example, the adjustable post is used with an arm that fits in the main aperture of a receiver hitch to support at least one adjustable post along the arm. In another example, the adjustable post is used with a support bar that is mountable across the bed of a truck, and thus allows the user to carry the bicycles over the bed of the truck. The bar that supports the adjustable post may engage the bed in one of many different ways, for example by clamping, fastening, or by telescopically extending and engaging the sides of the bed of the truck.

Still further, it is contemplated that the width adjustments to the adjustable post may be accomplished by selling a kit with several sleeves that fit over the post to shim the diameter of the post and accommodate different sized seat post tubes, as may be found in different bicycles. The shimming sleeves may cooperate with one another by fastening to one another, by connecting a shear pin through the sleeves to engage a core post, or by having a nut that fastens the entire assembly to the adjustable post. Still further, it is contemplated that the system may be sold with interchangeable posts, the posts having different external diameters, the diameters accommodating different seat post tube diameters.

It is also contemplated that the first end of the adjustable post may be placed in the connector arm that supports a trailer hitch ball, the adjustable post being inserted in lieu of the ball. Thus the adjustable post may be used to convert a device that is designed to carry a trailer into a device that can be used to transport a bicycle.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
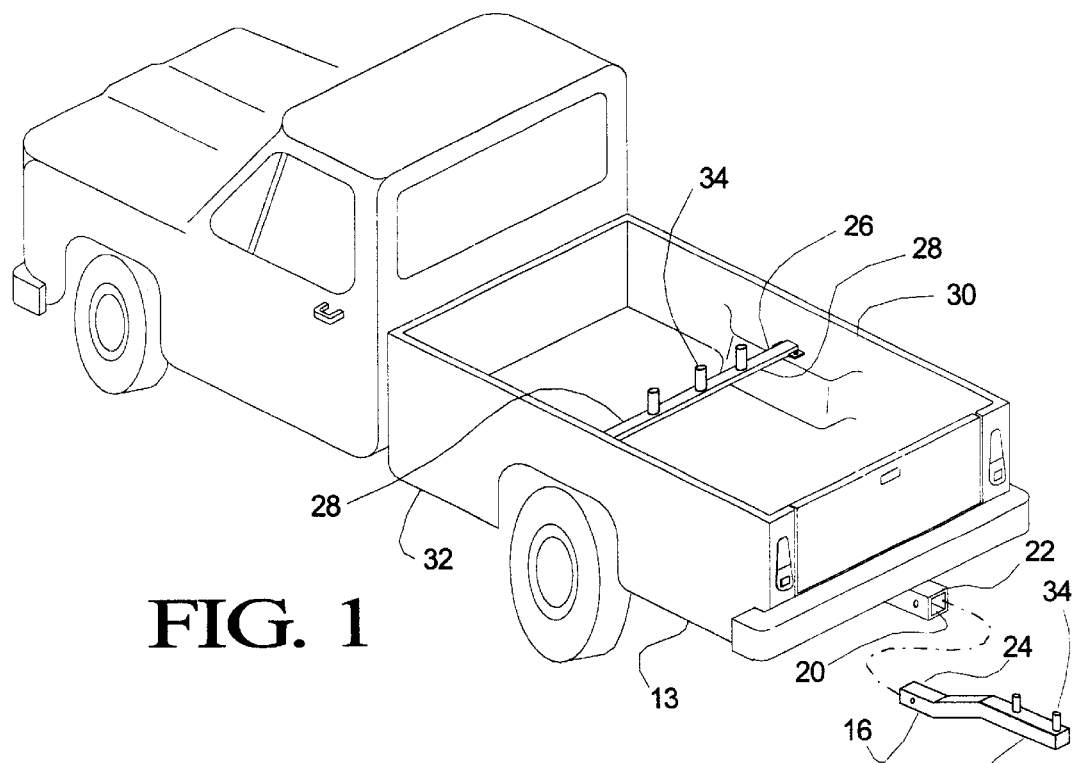
FIG. 1 is a perspective view of an embodiment of the invention, the view illustrating the attachment or mounting of the device on a receiver hitch of a vehicle.
Figure 2:
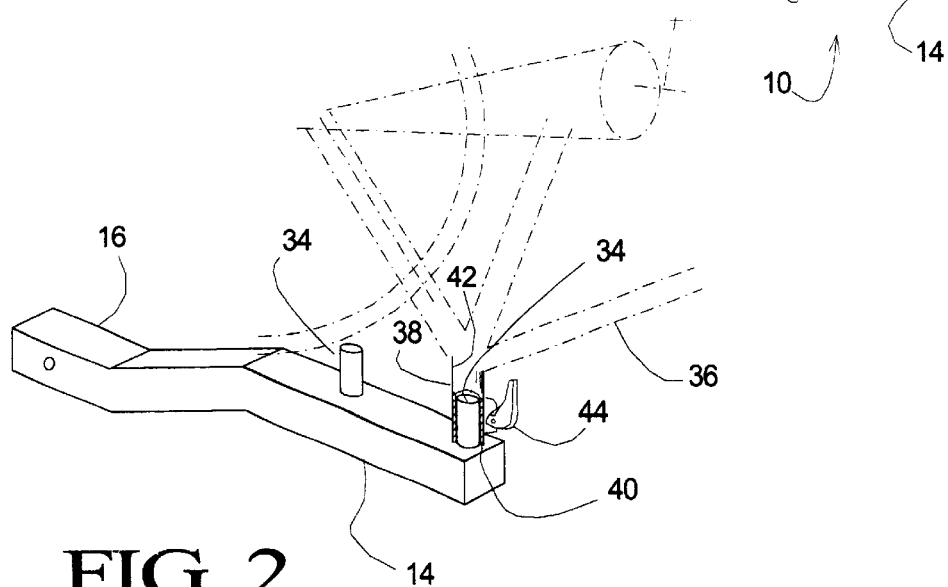
FIG. 2 is a perspective view illustrating the mounting of a bicycle on the disclosed system. The view illustrating that it is also contemplated that the bicycle will incorporate a tightening mechanism that will clamp the seat post tube against the support post, whether the support post is of a fixed external diameter or of adjustable external diameter.

Turning now to FIGS. 1 and 2 where a system 10 for supporting a bicycle frame 12 from a vehicle 13 or other support surface, such as a garage wall or ceiling. Importantly, the illustrated system is particularly useful a support structure such as a beam 14. It is contemplated that the beam 14 may consist of a first end 16 and a second end 18. The first end 16 being adapted for cooperation with a female portion 20 of a receiver hitch 22. Thus, one example of the beam 4 includes a male portion 24 with a generally square cross section that fits within the generally square cross section of the female portion 20 of the receiver hitch 22.

Also shown on FIG. 1 is that the disclosed system may be used with a support beam 26 that includes a pair of ends 28, and each of the ends 28 are supported from a support structure, such as the sides or bed 30 of the pick-up truck 32. It is important to note that while the system has been illustrated while in use in the bed 30 of the pickup truck 32, it is contemplated that the disclosed system may also be used in conjunction with a roof rack as used with cars, trucks or buses.

Turning now to FIG. 2 it will be understood that the disclosed system uses at least one adjustable post 34, which may be solid, one piece construction or incorporating the radial expansion features discussed below. The adjustable post 34 cooperates with a seat post tube 38 of the bicycle frame 36. The seat post tube 38 has an aperture 40 and internal surfaces 42. The seat post tube 38 will also incorporate an adjustment mechanism 44 that allows the user to tighten the seat post tube 38 around the seat post that supports the bicycle seat. The use of removable seat posts that support bicycle seats is well known.

The disclosed system provides the adjustable post 34 as shown in the enclosed figures to cooperate with the seat post tube 38 in the same manner as the well-known seat post that supports most bicycle seats. However, manufacturers of the well-known seat post provide seat posts in a variety of diameters or sizes. Therefore, in an example of the disclosed system the adjustable post 34 can accommodate a variety of different diameter seat post tubes 38 by expanding the surfaces that contact the internal surfaces 42 of the seat post tube 38.

Figure 3:
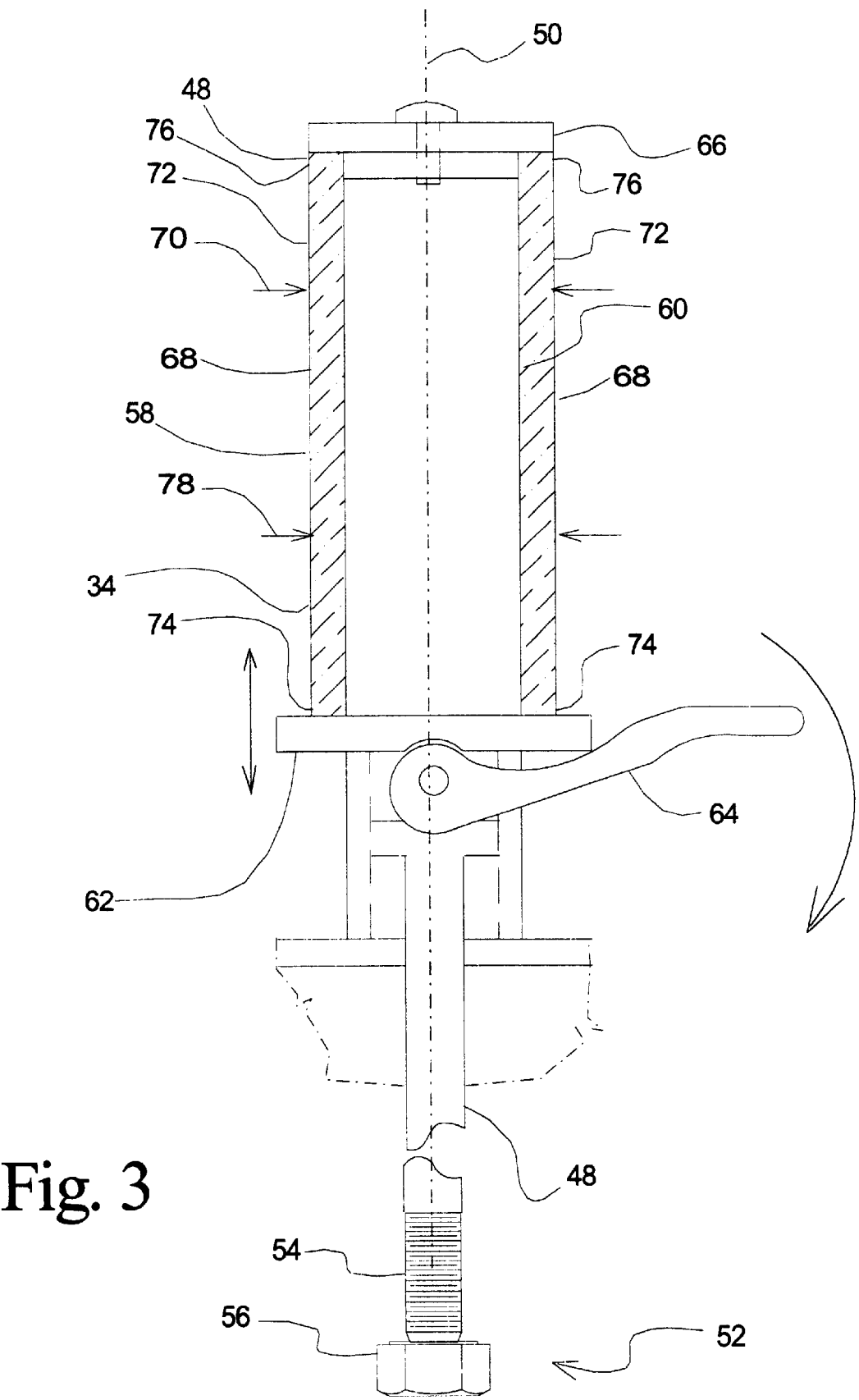
FIG. 3 is a sectional view of an example of an adjustable support post taught herein.
Figure 4:
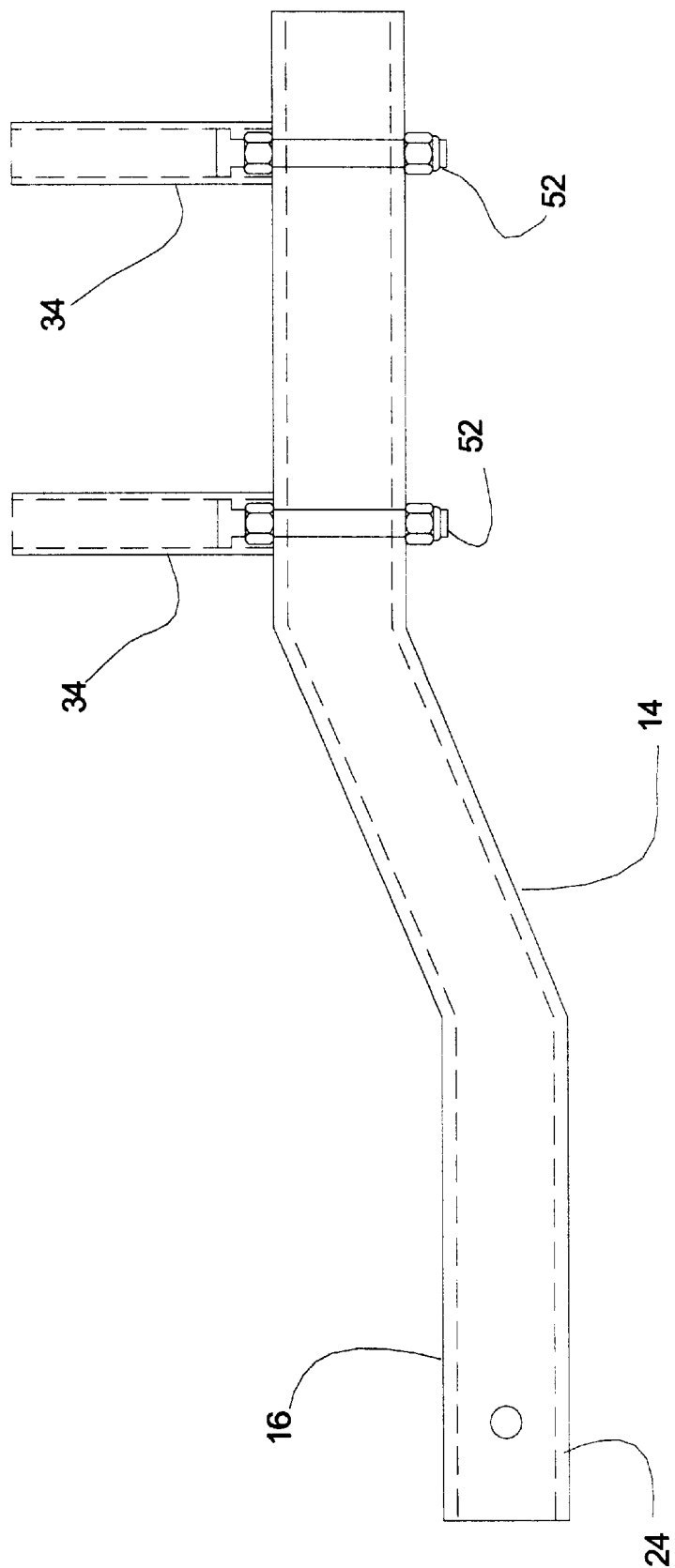
FIG. 4 is a side view of an arm with several support posts mounted on the arm, which mounts into a receiver hitch.

Turning now to FIGS. 3 and 4 it will be understood that it is contemplated that an example of the adjustable post 34 will include a first end 46 and a second end 48 along an axis 50. In the illustrated example, the first end 46 includes an attachment mechanism 52, which is adapted for attaching the adjustable post 34 to the support surface the support beam 14. The example shown in FIG. 3 incorporates a simple threaded stud 54 and nut 56 arrangement to allow the user to mount the adjustable post 34 on the support beam 14. Thus, it is contemplated that the support beam 14 may include a single aperture, as may be found on a standard trailer hitch attachment that supports a hitch-ball. With these known devices, it is contemplated that the user may simply remove the hitch ball from the beam and install the adjustable post 34 in place of the ball. The bicycle is then mounted on the adjustable post 34.

The example in FIG. 3 includes a resilient, elastic sleeve 58 that is mounted along an axle 60. A moveable first plate 62 is mounted near the first end 46 of the adjustable post 34. A mechanism 64 for moving the first plate 62 along the axis 50 is incorporated into the adjustable post 34. A second plate 66 or a stop or retainer is used near the second end 48 of the adjustable post 34. Movement of the first plate 62 towards the second plate 66 is accomplished through the use of the mechanism 64, which may be the lever and cam system illustrated in FIG. 3, or a simple screw mechanism that urges the first plate 62 towards the second plate 66, or other mechanisms, such as ratchets and pawls, or other leveraged mechanisms, shown in FIG. 2.

The second end 48 of the adjustable post 34 will include at least two generally parallel surface areas 68 that are at an adjustable distance 70 from one another. At least one of the generally parallel surface areas 68 includes at least two surface points 72 that are radially moveable in a generally parallel fashion from the axis 50 of the adjustable post 34, so that the distance between the generally parallel areas 68 can be enlarged or reduced in a generally radial manner from the axis 50 to allow the adjustable post 34 to cooperate or engage the interior or internal surface 42 of the seat post tube 38.

Thus, in the example shown in FIG. 3, the generally parallel surface areas 68 are on an elastic sleeve 58, and movement of the first plate 62 towards the second plate 66 squeezes the first end 74 of the elastic sleeve towards the second end 76 of the elastic sleeve 58 causing an expansion of the elastic sleeve 58. The expansion of the elastic sleeve 58 causes the surface points 72 and surface areas 68 to move away from one another in a radial manner, causing the surface points 72 to move in a generally parallel fashion from the axis 50, and causing a variation in the adjustable distance 70. This variation in this example is partially due to the Poisson's ratio of the particular material used to manufacture the elastic sleeve 58.

Turning now to FIG. 4, it will be understood that the beam 14 may accommodate more than one adjustable post 34. Additionally, it is contemplated that if an individual wishes to support bicycles with seat post tubes having the same size aperture, then the adjustable posts 34 may simply be of a fixed size or external diameter 78. The posts may be removable to allow adjustment of the space between the bicycles to be carried, or they may be fixed if it is contemplated that the fixed spacing will work for the anticipated uses.

Figure 5:
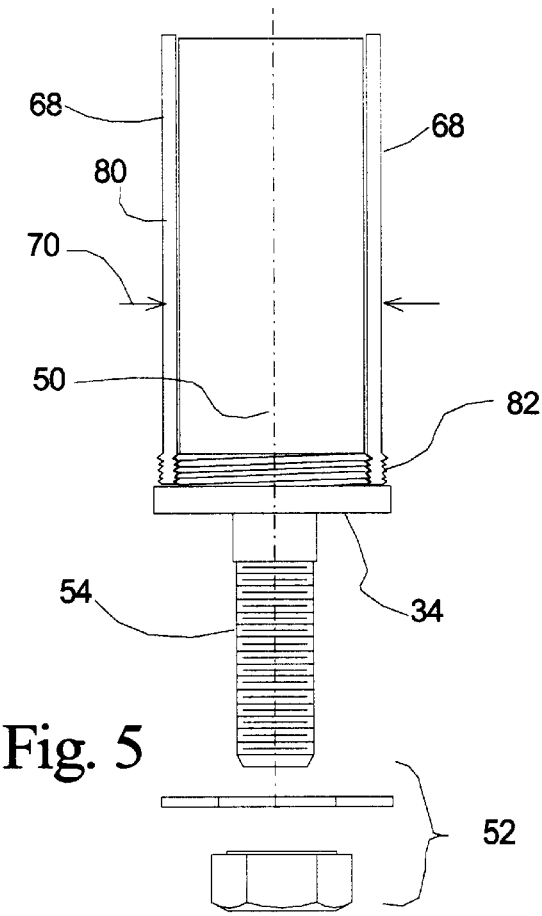
FIG. 5 is a sectional view of yet another example of an adjustable support post as taught herein.
Figure 6:
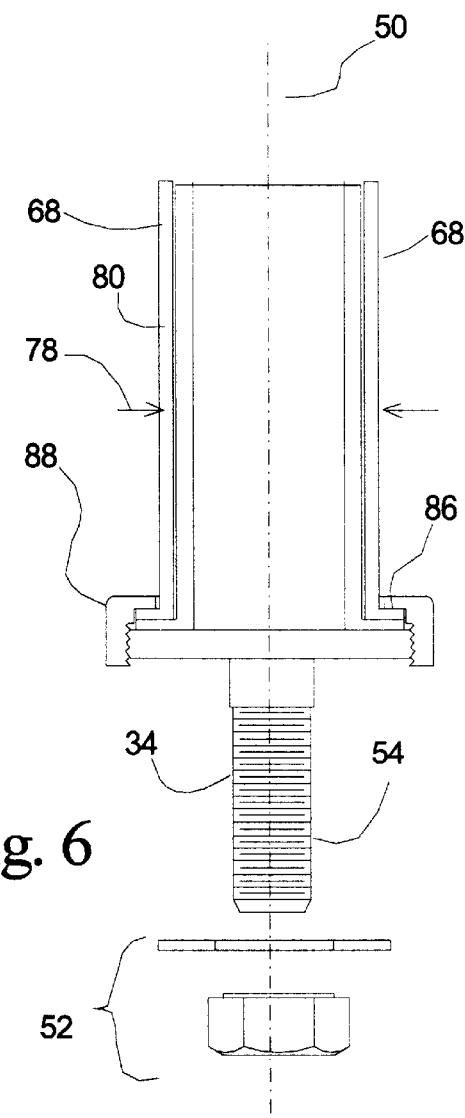
FIG. 6 is a sectional view of yet another example of an adjustable support post as taught herein.
Figure 7:
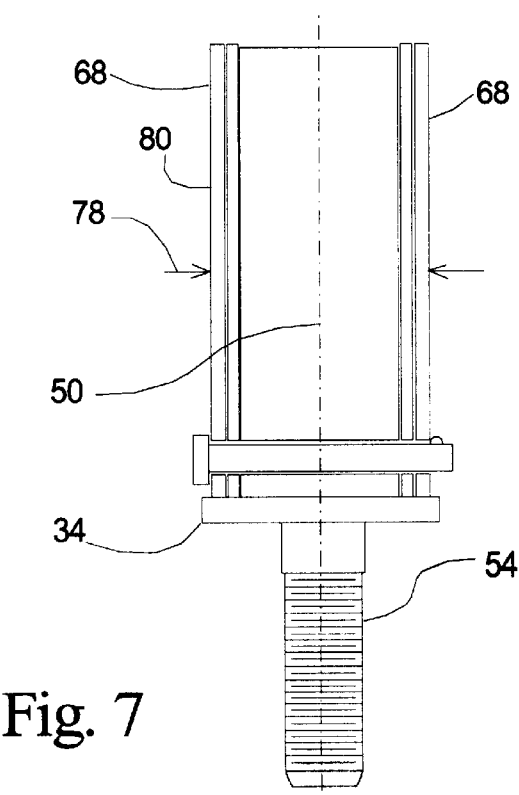
FIG. 7 is a sectional view of yet another example of an adjustable support post as taught herein.

FIG. 5 illustrates another way to cause a variation in the adjustable distance 70 between the surface areas 68 while keeping the surface points 72 generally parallel to the axis 50. In this example several concentric tubes 80 are mounted over one another and fixed against one another by way of threaded sections 82. Alternatively, FIG. 6 shows concentric tubes 84 that use of flared ends 86 that chat are captured beneath a retaining nut 88 FIG. 7 shows yet another example of a mechanism that accomplishes variation of the distance between the surface areas 68 while keening the surface points 72 generally parallel to the axis 50. In this example, concentric tubas are used, however the concentric tubes used to create the desired distance between the surface points 72 are held on the adjustable post by a pin 90.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A system for supporting a bicycle frame from a support structure, the bicycle frame having a seat post tube having an aperture of a size, the aperture being adapted for accepting a seat post for supporting a bicycle seat from the bicycle frame, the system comprising:
   An adjustable post having a first end and a second end along an axis, the first end having an attachment mechanism adapted for attachment to the support surface structure; and
   The second end supporting at least two generally parallel surface areas at an adjustable distance from one another, said generally parallel surface areas are on an elastic sleeve having a first end and a second end, and a movable plate is mounted against the elastic sleeve, the movable late including a mechanism for moving the movable plate and compressing the elastic sleeve along the axis squeezing the first end of the elastic sleeve towards the second end of the elastic sleeve, causing the generally parallel surface areas to move away from one another, at least one of the generally parallel surface areas including at least two surface points along a line that is generally parallel to the axis, the generally parallel surface areas are radially moveable in a generally parallel fashion from the axis of the adjustable post, so that the distance between the generally parallel areas can be enlarged or reduced in a generally radial manner from the axis to create or maintain line contact with the interior surface of the seat post tube.

2. A system according to claim 1 wherein said mechanism for moving the movable plate comprises a cammed lever and a movable compression plate, the cammed lever being positioned next to the first end of the adjustable post, the compression plate being positioned along the axis of the adjustable post, next to the first end of the elastic sleeve and between the cammed lever and the first end of the elastic sleeve, so that movement of the cammed lever will urge the compression plate against the first end of the elastic sleeve, moving the first end of the elastic sleeve towards the second end of the elastic cover, squeezing the elastic sleeve and movement of the surface areas away from one another.

3. A system according to claim 2 wherein the attachment mechanism adapted for attachment to the support surface comprises an adjustable fastener.

4. A system for supporting a bicycle frame from a vehicle, the bicycle frame having a seat post tube having an aperture of a size, the aperture being adapted for accepting a seat post for supporting a bicycle seat from the bicycle frame, the system comprising:
   a support structure comprising a beam, the beam having at least one end adapted for support from the vehicle, said beam further comprises a first end and a second end, the first end of said beam includes a generally square cross-section adapted for engagement with a generally square female portion of a receiver hitch;
   an adjustable post having a first end and a second end along an axis, the first end having an attachment mechanism adapted for attachment to the support surface structure; and the second end supporting at least two generally parallel surface areas at an adjustable distance from one another, at least one of the generally parallel surface areas including at least two surface points along a line that is radially moveable in a generally parallel fashion from the axis of the adjustable post, so that the distance between the generally parallel areas can be enlarged or reduced in a generally radial manner from the axis to create or maintain line contact with the interior surface of the seat post tube.

5. A system according to claim 4 wherein said generally parallel surface areas are on an elastic sleeve having a first end and a second end, so that the adjustable distance of said generally parallel surface areas is adjusted by squeezing the first end of the elastic sleeve towards the second end of the elastic sleeve.

6. A system according to claim 5 and further comprising a cammed lever and a movable compression plate, the cammed lever being positioned next to the first end of the adjustable post, the compression plate being positioned along the axis of the adjustable post, next to the first end of the elastic sleeve and between the cammed lever and the first end of the elastic sleeve, so that movement of the cammed lever will urge the compression plate against the first end of the elastic sleeve, moving the first end of the elastic cover towards the second end of the elastic sleeve, squeezing the elastic sleeve and causing the movement of the surface areas away from one another.

7. A method for supporting a bicycle frame from a support structure, the bicycle frame having a seat post tube having an aperture of a size and an interior portion, the aperture being adapted for accepting a seat post for supporting a bicycle seat from the bicycle frame, the method comprising:
   providing an adjustable post having a first end and a second end along an axis, the first end having an attachment mechanism adapted for attachment to the support structure, the second end supporting at least two generally parallel surface areas at an adjustable distance from one another, at least one of the generally parallel surface areas including at least two surface points along a line that is radially moveable in a generally parallel fashion from the axis of the adjustable post, so that the distance between the generally parallel areas can be enlarged or reduced in a generally radial manner from the axis to create or maintain line contact with the interior surface of the seat post tube;

mounting said adjustable post on a support arm adapted for engagement with a female portion of a receiver hitch and using the two generally parallel surface areas to engage the interior surface of the seat post tube, so that the bicycle is supported solely by the adjustable post.

* * * * *